US 9,925,901 B2

(12) United States Patent
Line et al.

(10) Patent No.: US 9,925,901 B2
(45) Date of Patent: Mar. 27, 2018

(54) MULTI-COMPONENT SPRING SYSTEM FOR DYNAMIC THIGH AND CUSHION SUPPORT

(71) Applicant: Ford Global Technologies, LLC, Dearborn, MI (US)

(72) Inventors: Johnathan Andrew Line, Northville, MI (US); Marcos Silva Kondrad, Macomb Township, MI (US); S. M. Akbar Berry, Windsor (CA); Amber LaVerne Hall, Oak Park, MI (US); Michael Kolich, Windsor (CA); Rodney Charles Brinker, Eastpointe, MI (US); Carol Casey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 15/091,820

(22) Filed: Apr. 6, 2016

(65) Prior Publication Data
US 2017/0291521 A1  Oct. 12, 2017

(51) Int. Cl.
*B60N 2/70* (2006.01)
*B60N 2/62* (2006.01)
*B60N 2/02* (2006.01)

(52) U.S. Cl.
CPC ............... *B60N 2/62* (2013.01); *B60N 2/02* (2013.01); *B60N 2/70* (2013.01)

(58) Field of Classification Search
CPC .................................... B60N 2/70; B60N 2/62
See application file for complete search history.

(56) References Cited

U.S. PATENT DOCUMENTS

| | | | |
|---|---|---|---|
| 4,324,431 A | 4/1982 | Murphy et al. | |
| 4,541,669 A | 9/1985 | Goldner | |
| 5,080,433 A | 1/1992 | Hayden | |
| 5,647,635 A | 7/1997 | Aumond et al. | |
| 5,908,220 A * | 6/1999 | Bauer | B60N 2/62 297/284.1 |
| 6,402,245 B1 | 6/2002 | Newton et al. | |
| 7,578,554 B2 | 8/2009 | Lee et al. | |
| 7,806,476 B2 | 10/2010 | Forgatsch et al. | |
| 9,090,185 B2 | 7/2015 | McMillen et al. | |
| 9,694,716 B2 * | 7/2017 | Masuda | B60N 2/02 |
| 2008/0174164 A1 * | 7/2008 | Becker | B60N 2/62 297/452.55 |
| 2009/0039690 A1 * | 2/2009 | Simon | B60N 2/0224 297/344.1 |
| 2013/0278041 A1 * | 10/2013 | Matsumoto | B60N 2/7094 297/452.49 |
| 2014/0306504 A1 * | 10/2014 | Boy | B60N 2/62 297/313 |
| 2015/0108816 A1 * | 4/2015 | Dry | B60N 2/62 297/423.19 |

(Continued)

*Primary Examiner* — Timothy J Brindley
(74) *Attorney, Agent, or Firm* — Vichit Chea; Price Heneveld LLP

(57) ABSTRACT

A vehicle seat includes a tilt plate rotationally coupled at a first horizontal axis to a front of a base. A cushion spring extends from a rear of the base to the tilt plate. Rotation of the tilt plate rotates the cushion spring about a second horizontal axis. A thigh support is rotationally coupled to the tilt plate. A dynamic spring biases the thigh support away from the tilt plate.

18 Claims, 7 Drawing Sheets

(56) References Cited

U.S. PATENT DOCUMENTS

| | | | |
|---|---|---|---|
| 2015/0274050 A1* | 10/2015 | Hosbach | B60N 2/62 297/423.26 |
| 2015/0283931 A1* | 10/2015 | Line | B60N 2/62 297/423.19 |
| 2017/0028875 A1* | 2/2017 | Masuda | B60N 2/62 |

* cited by examiner

MULTI-COMPONENT SPRING SYSTEM FOR DYNAMIC THIGH AND CUSHION SUPPORT

FIELD OF THE INVENTION

The present invention generally relates to vehicle seating, and more specifically, a multi-component spring system for providing dynamic support to thigh and seat cushion areas of a vehicle seat.

BACKGROUND OF THE INVENTION

Conventional vehicle seats typically include multiple springs that provide various support to portions of the vehicle seat. These springs provide various levels of cushioning to certain areas of the occupant's body as they rest within the vehicle seat. These spring assemblies are typically designed to provide support not only while the occupant is stationary but also as the occupant moves within the seat, typically during operation of a vehicle by the driver. These spring assemblies also typically provide support to occupants of varying sizes, such that smaller and larger occupants can be supported by the same vehicle seat design.

SUMMARY OF THE INVENTION

According to one aspect of the present invention, a vehicle seat includes a tilt plate coupled to a front of a base and operable about a first horizontal axis between a plurality of tilting positions. A cushion spring extends from a rear of the base to the tilt plate proximate the first horizontal axis. Operation of the tilt plate about the first horizontal axis further operates the cushion spring about a second horizontal axis positioned proximate the rear of the base.

According to another aspect of the present invention, a vehicle seat includes a tilt plate rotationally coupled at a first horizontal axis to a front of a base. A cushion spring extends from a rear of the base to the tilt plate. Rotation of the tilt plate rotates the cushion spring about a second horizontal axis. A thigh support is rotationally coupled to the tilt plate. A dynamic spring biases the thigh support away from the tilt plate.

According to another aspect of the present invention, a vehicle seat includes a plate spring biasing a tilt plate toward an upward position relative to a base. A dynamic spring biases a thigh support away from the tilt plate. A downward force applied to the thigh support biases the thigh support toward the tilt plate, biases the tilt plate in a rotationally downward direction, and biases the plate spring to a lower position relative to the base.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
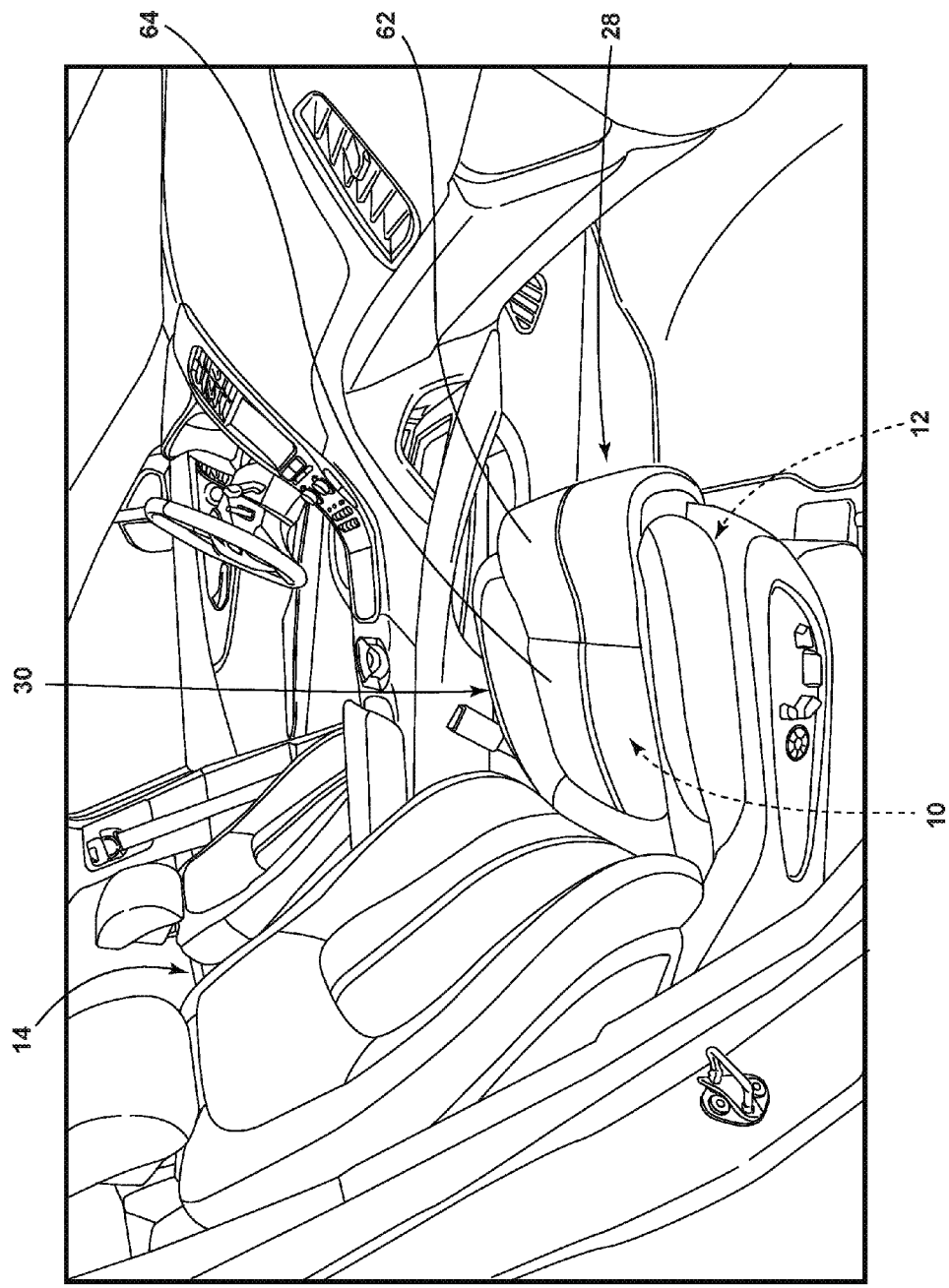
FIG. 1 is a side perspective view of a passenger cabin of a vehicle having vehicle seats that incorporate aspects of the multi-component spring assembly.
Figure 2:
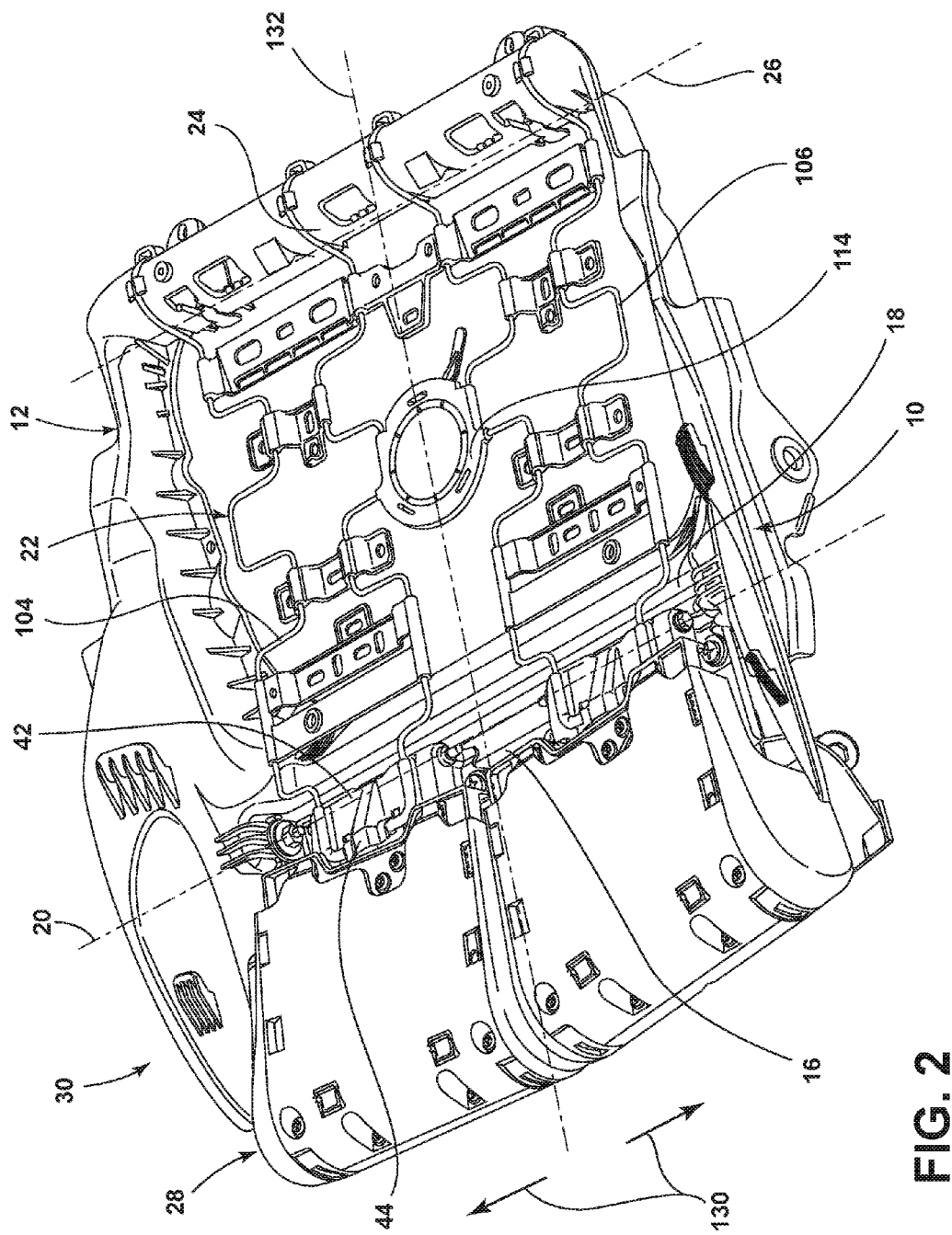
FIG. 2 is a top perspective view of a base of a vehicle seat incorporating the multi-component spring assembly.
Figure 3:
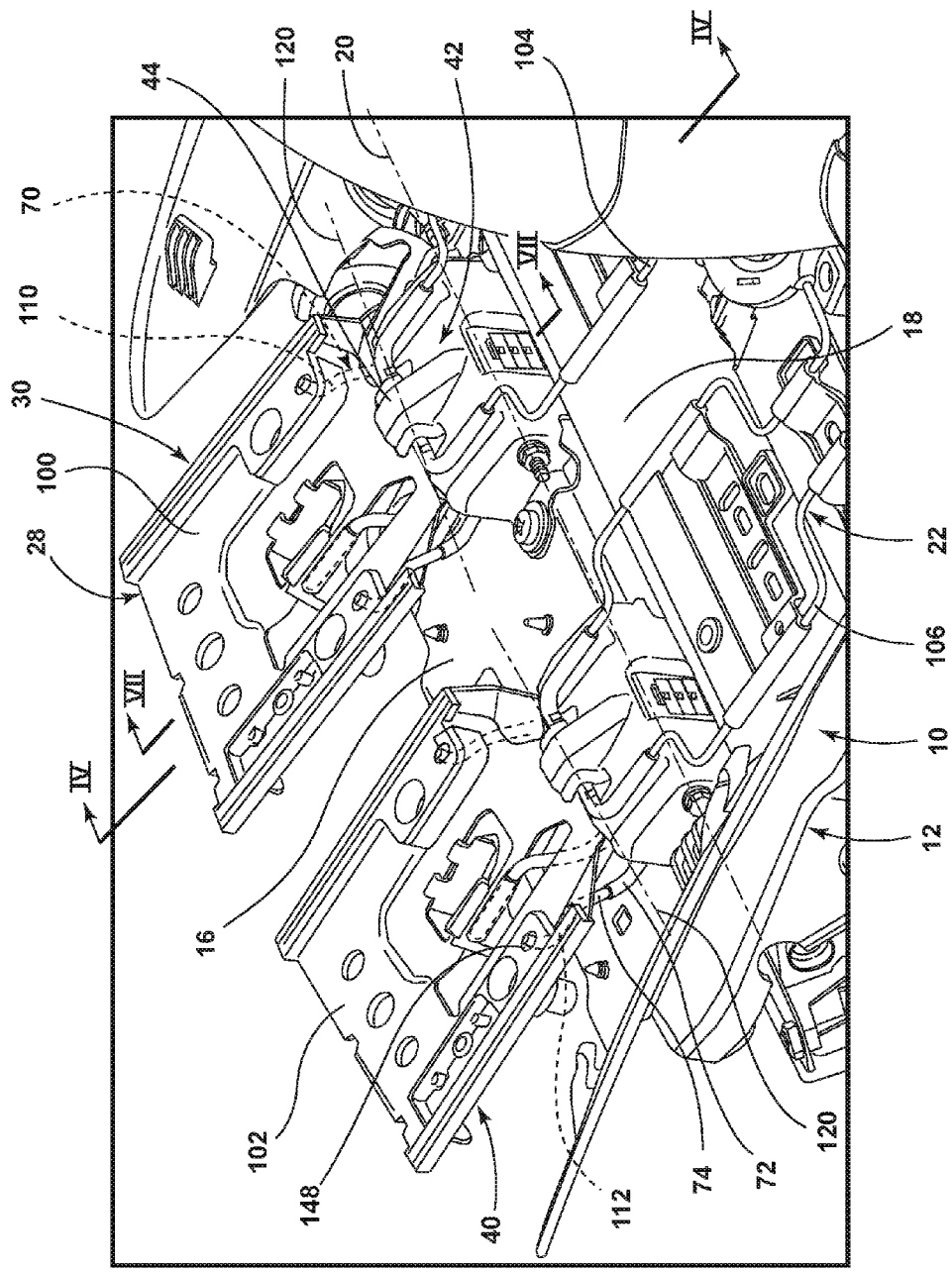
FIG. 3 is a top perspective view of a vehicle seat with the cushions removed and illustrating an aspect of the multi-component spring assembly.
Figure 4:
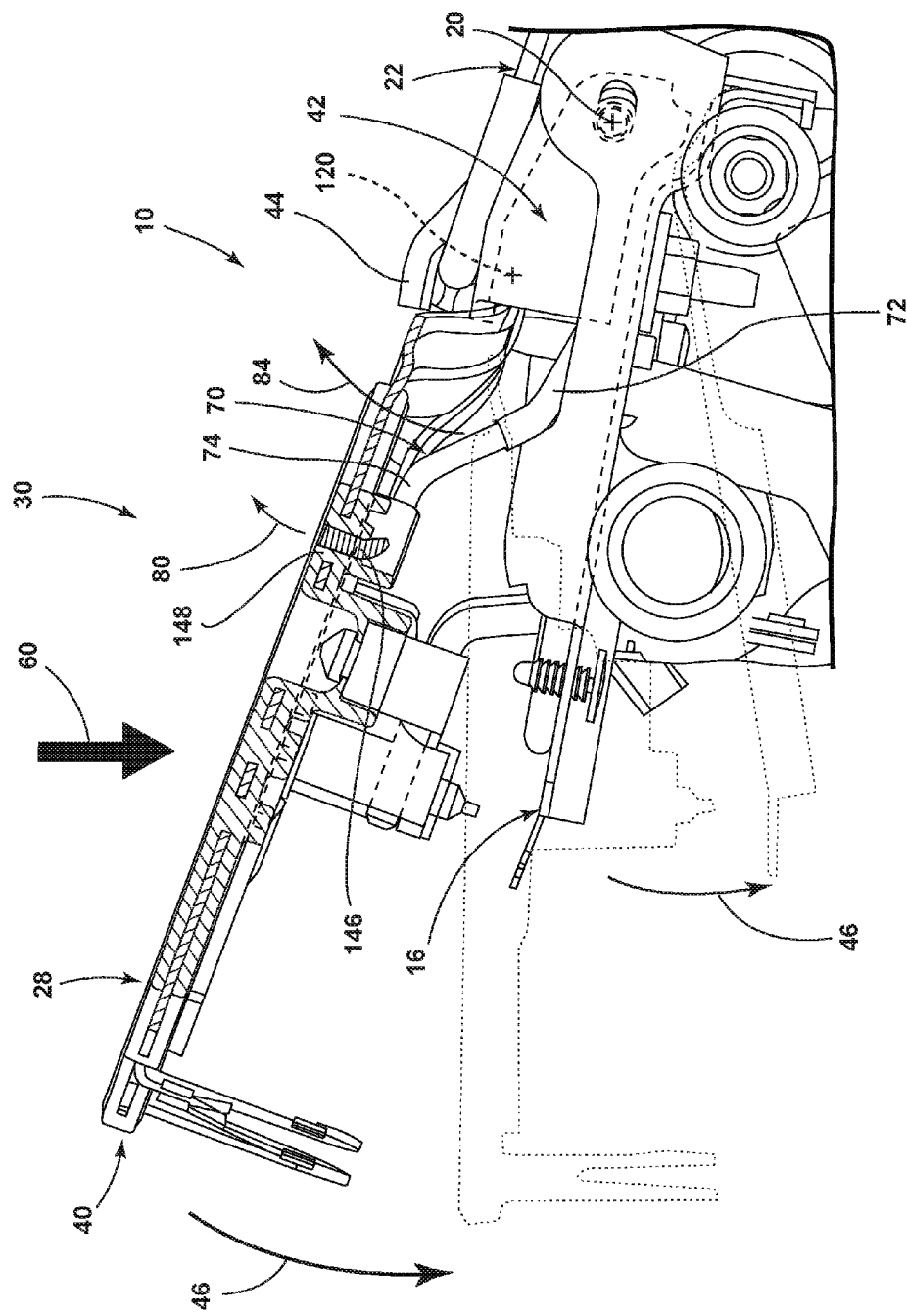
FIG. 4 is a cross-sectional view of the vehicle seat of FIG. 3 taken along line IV-IV.
Figure 5:
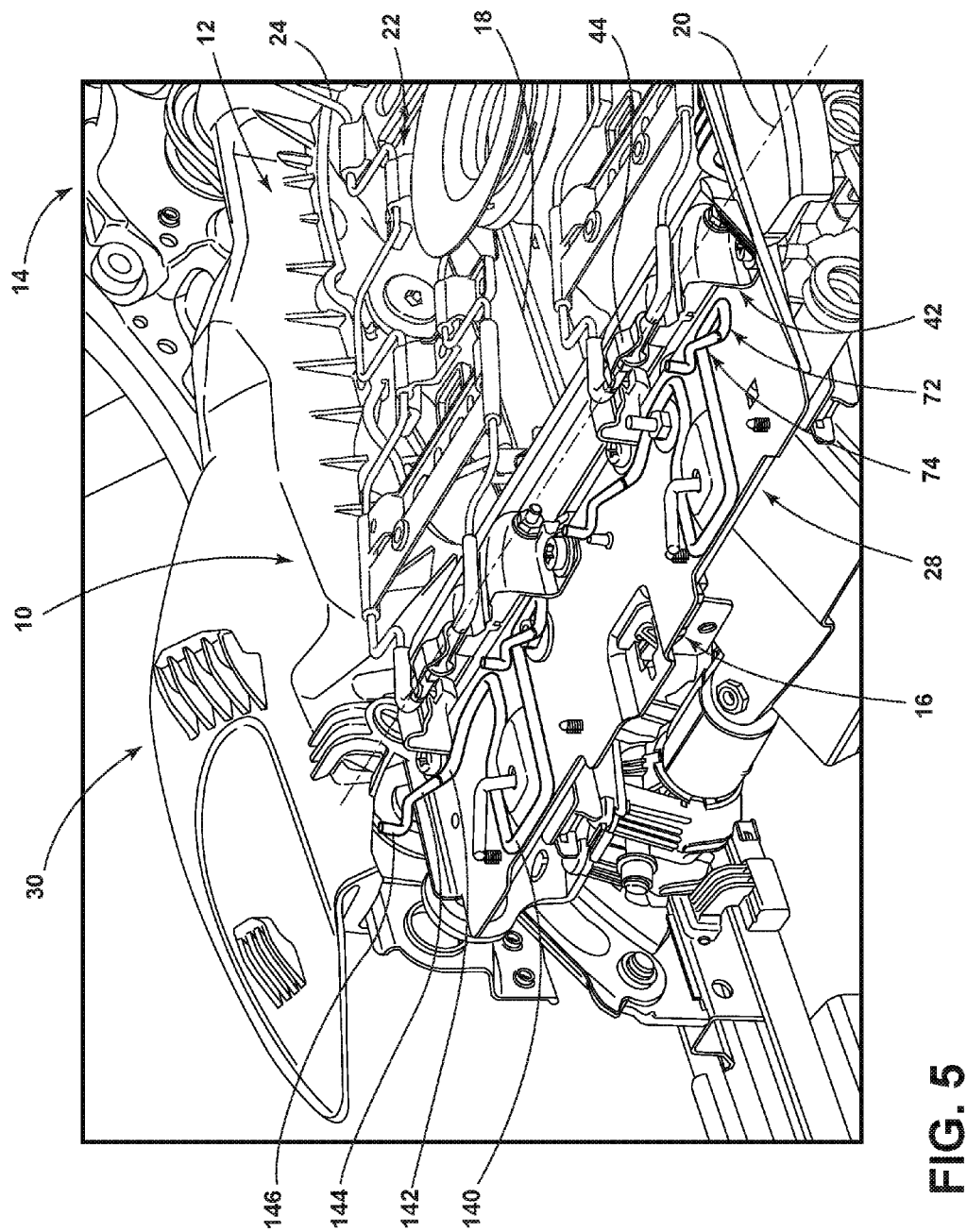
FIG. 5 is a front perspective view of a vehicle seat incorporating the multi-component spring assembly with the cushion and thigh supports removed.
Figure 6:
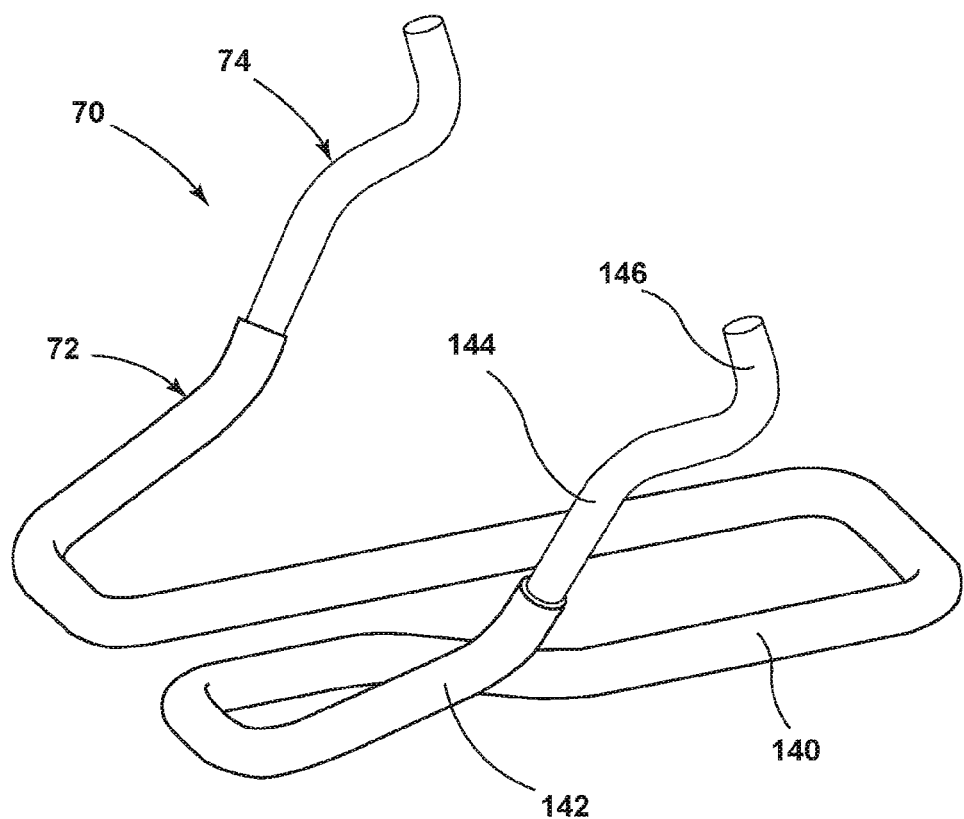
FIG. 6 is a top perspective view of an aspect of a dynamic spring of the multi-component spring assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a multi-component spring assembly that is incorporated within a base 12 of a vehicle seat 14. The vehicle seat 14 can include a tilt plate 16 that is coupled to a front 18 of the base 12. The tilt plate 16 is operable about a first horizontal axis 20 between a plurality of tilting positions. A cushion spring 22 of the multi-component spring assembly 10 extends from a rear 24 of the base 12 to the tilt plate 16 and is attached to the tilt plate 16 proximate the first horizontal axis 20. Operation of the tilt plate 16 about the first horizontal axis 20 further operates the cushion spring 22 about a second horizontal axis 26 that is positioned proximate a rear 24 of the base 12 of the vehicle seat 14. It is contemplated that the cushion spring 22 is adapted to bias the tilt plate 16 toward an upward position 28 of the plurality of tilting positions. The upward position 28 of the tilt plate 16 corresponds to an unloaded state 30 of the multi-component spring assembly 10 and the base 12 of the vehicle seat 14 generally.

Referring again to FIGS. 1-9, a thigh support 40 is rotationally coupled to the tilt plate 16 proximate a suspension anchor 42. The suspension anchor 42 extends upward from a tilt plate 16 to a cushion spring anchor 44, wherein the cushion spring 22 extends from the rear 24 of the base 12 and connects to the tilt plate 16 at the cushion spring anchor 44. According to the various embodiments, the thigh support 40 is biased away from the tilt plate 16 and toward the unloaded state 30 of the multi-component spring assembly 10. It is contemplated that operation of the tilt plate 16 and the cushion spring anchor 44 in a rotationally downward direction 46 and about the first horizontal axis 20 serves to bias the cushion spring 22 in a direction away from the rear 24 of the base 12. This motion of the cushion spring 22 in a direction away from the rear 24 of the base 12 due to the rotation of the cushion spring anchor 44 serves to operate the cushion spring 22 to a lowered position 48 away from the unloaded state 30 of the multi-component spring assembly 10.

Figure 7:
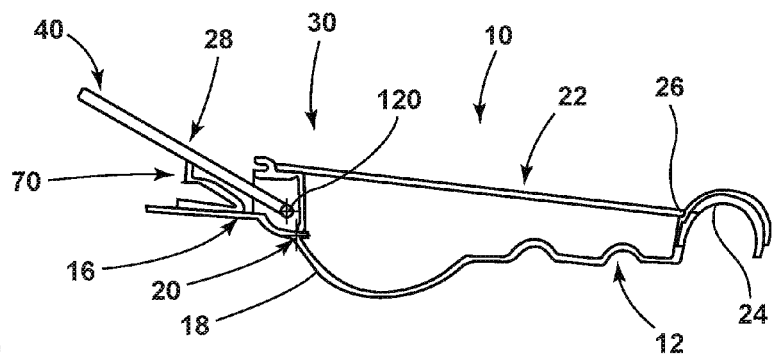
FIG. 7 is a schematic cross-sectional view of a base for a vehicle seat incorporating an aspect of the multi-component spring assembly and showing the multi-component spring assembly in an unloaded position.
Figure 8:
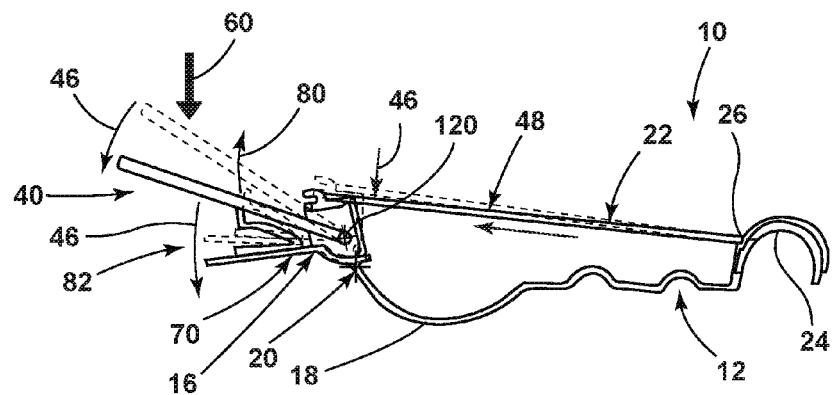
FIG. 8 is a schematic cross-sectional view of the base of the vehicle seat of FIG. 7 illustrating the multi-component spring assembly in a partially loaded state.
Figure 9:
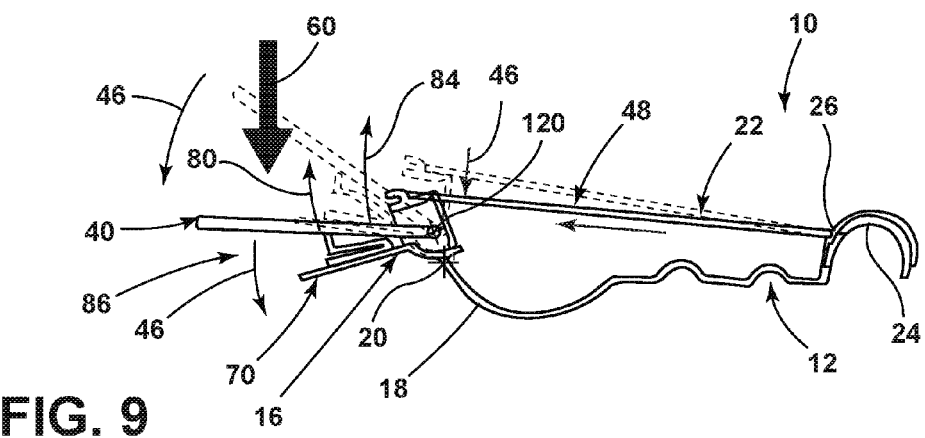
FIG. 9 is a schematic cross-sectional view of the base of FIG. 7 illustrating the multi-component spring assembly in a fully loaded state.

Referring now to FIGS. 7-9, when a downward force 60 is applied to the thigh support 40, the downward force 60 biases the thigh support 40 toward the tilt plate 16. This, in turn, biases the tilt plate 16 in the rotationally downward direction 46, such that the tilt plate 16 and the cushion spring anchor 44 move in the rotationally downward direction 46. These movements, in turn, operate the cushion spring 22 away from the unloaded state 30 and toward the lowered position 48 of the cushion spring 22, wherein the exact angle of the lowered position 48 depends upon the degree of the downward force 60 applied to thigh support 40 that results in movement of the thigh support 40 and tilt plate 16. In this manner, the downward force 60 applied to the thigh support 40 provides for a dynamic movement of the thigh support 40, tilt plate 16 and cushion spring 22 such that the multi-component spring assembly 10 serves to operate, in a proportional relationship, a thigh cushion 62 and base cushion 64 in response to the downward force 60 applied to the thigh support 40. When the downward force 60 is removed, the multi-component spring assembly 10 biases the cushion spring 22, tilt plate 16 and thigh support 40 back to the unloaded state 30.

Referring again to FIGS. 3-9, the multi-component spring assembly 10 can include a dynamic spring 70 that is positioned between the thigh support 40 and the tilt plate 16, wherein the dynamic spring 70 includes a high-resistance portion 72 and a low-resistance portion 74. It is contemplated that the high-resistance portion 72 can be defined by a larger cross-sectional portion of the dynamic spring 70 and the low-resistance portion 74 can be defined by a thinner cross-sectional portion of the dynamic spring 70. Typically, the high-resistance portion 72 can be coupled to the tilt plate 16 and the low-resistance portion 74 can be coupled to the thigh support 40. It should be understood that these configurations could be switched such that the high and low-resistance portions 72, 74 are alternating depending upon the design of the vehicle seat 14 and the needs of the user.

Referring again to FIGS. 3-9, as the downward force 60 is applied to the thigh support 40, the low-resistance portion 74 exerts a first upward biasing force 80 to the thigh support 40. Accordingly, a downward movement of the thigh support 40 from the unloaded state 30 includes a first downward portion 82 (exemplified in FIG. 8) that is primarily opposed by the first upward biasing force 80. It is further contemplated that the high-resistance portion 72 of the dynamic spring 70 exerts a second upward biasing force 84 to the thigh support 40. Typically, the second upward biasing force 84 is greater than the first upward biasing force 80. In such an embodiment, the downward movement of the thigh support 40, after the thigh support 40 moves through the first downward portion 82, defines a second downward portion 86 (exemplified in FIGS. 4 and 7) that is opposed by both the first and second upward biasing forces 80, 84 of the low and high-resistance portions 74, 72, respectively, of the dynamic spring 70. In this manner, where a smaller occupant sits within the vehicle seat 14, the user's legs may have lesser weight such that a lesser downward force 60 is applied to the thigh supports 40. In this situation, a smaller user is able to experience the downward movement of the thigh support 40, as well as the cushion spring 22 as the thigh support 40 moves downward through the first downward portion 82 and is opposed only by the first upward biasing force 80. Alternatively, where a larger occupant sits in the vehicle seat 14, the dynamic spring 70 utilizes both the first and second upward biasing forces 80, 84 of the low and high-resistance portions 74, 72 to oppose the greater downward force 60 exerted by the weight of the larger user's legs.

Without the incorporation of the high-resistance portion 72 that exerts the second upward biasing force 84, the weight of a larger occupant may entirely overcome the first upward biasing force 80 provided by the low-resistance portion 74 of the dynamic spring 70. Such a configuration may result in the thigh support 40 colliding with the tilt plate 16, where a smaller spring may completely compress.

According to the various embodiments, the incorporation of the high-resistance portion 72 that exerts the second upward biasing force 84 provides a dynamic biasing force exerted between the thigh support 40 and the tilt plate 16, such that as greater weight and greater downward force 60 is exerted upon the thigh support 40, the first and second upward biasing forces 80, 84 progressively exert greater biasing force to oppose such increased downward force 60. Accordingly, through the use of the dynamic spring 70, both small and large occupants of vehicle seats 14 can experience the various dynamic movements of the thigh support 40, tilt plate 16 and cushion spring 22 to allow for greater comfort to occupants, having a wide range of body types, during use of the vehicle.

According to the various embodiments, the dynamic spring 70 can include one or more intermediate upward biasing forces. The inclusion of the one or more intermediate resistance portions can provide additional biasing gradients that oppose the downward force 60 and also provide a more gradual cushioning sensation.

Referring again to FIGS. 1-9, the multi-component spring assembly 10 for the vehicle seat 14 includes the cushion spring 22 that biases the tilt plate 16 toward the upward position 28 relative to the base 12, where the upward position 28 corresponds to the unloaded state 30 of the multi-component spring assembly 10. The dynamic spring 70 biases the thigh support 40 away from a tilt plate 16. As discussed above, when a downward force 60 is applied to the thigh support 40, the downward force 60 biases the thigh support 40 toward the tilt plate 16. This, in turn, biases the tilt plate 16 in the rotationally downward direction 46 and further biases and at least partially stretches the plate spring away from the rear 24 of the base 12 and toward the lower position relative to the base 12. In this manner, the downward force 60 applied to the thigh support 40 serves to dynamically operate the entire base 12 of the seat to receive the legs of the occupant and provide a dynamically configured comfort experience to most any occupant body type that rests in the vehicle seat 14.

Referring again to FIGS. 1-9, it is contemplated that the vehicle seat 14 can include right and left thigh supports 100, 102 that are adapted for independent and selective movement with respect to the tilt plate 16. According to the various embodiments, it is contemplated that the tilt plate 16 can include a single member that extends across the front 18 of the base 12. In such an embodiment, operation of the right and left thigh supports 100, 102 can be selective and independent to account for, as an example, movements of a driver's legs as they control the pedals for operating the vehicle. These independent movements of the thigh supports 40 translate to a single tilt plate 16 that extends across the front 18 of the base 12, such that the independent movements of each of the thigh supports 40 does not translate to independent movements of right and left portions 104, 106 of the cushion spring 22. Accordingly, downward movement of one of the right and left thigh supports 100, 102 may serve to move the tilt plate 16 downward, and, in turn, move the entire cushion spring 22 to the lowered position of a plurality of lowered positions 48 of the cushion spring 22.

According to various alternate embodiments, it is contemplated that each of the right and left thigh supports 100, 102 may also be coupled to an independently operable portion of a tilt plate 16. By way of example, and not limitation, in such an embodiment, a downward movement of a right thigh support 100 may translate to a rotational movement of a right tilt plate 16 that then translates to a movement of a right portion 104 of the cushion spring 22 to one of the lowered positions 48. During such movement, the left thigh support 102, left tilt plate 16 and left portion 106 of the cushion spring 22 may remain unchanged or may move independently of the corresponding right-side portions of the vehicle seat 14.

Referring again to FIGS. 1-9, where right and left thigh supports 100, 102 are adapted for independent and selective movement with respect to the single tilt plate 16, a first dynamic spring 110 can bias the right thigh support 100 away from the tilt plate 16 and a second dynamic spring 112 can bias the left thigh support 102 away from the tilt plate 16. It is contemplated that the cushion spring 22 can include a right portion 104 coupled to the tilt plate 16 proximate the right thigh support 100. A left portion 106 of the cushion spring 22 can be coupled to the tilt plate 16 proximate the left thigh support 102. According to various embodiments, the right and left portions 104, 106 of the cushion spring 22 can be coupled at a central portion 114 of the cushion spring 22, such that various movements of the cushion spring 22 can be transferred throughout the entire cushion spring 22 between the right and left portions 104, 106 thereof.

Referring again to FIGS. 3-9, the vehicle seat 14 can include the tilt plate 16 that is rotationally coupled at the first horizontal axis 20 at a front 18 of the base 12. The cushion spring 22 extends from a rear 24 of the base 12 to the tilt plate 16, wherein rotation of the tilt plate 16 rotates the cushion spring 22 about the second horizontal axis 26. The second horizontal axis 26 is typically positioned at a rear 24 of the base 12 where the cushion spring 22 engages the base 12. With the first horizontal axis 20 at the front 18 of the base 12 and the second horizontal axis 26 at the rear 24 of the base 12, the dynamic movement of the multi-component spring assembly 10 is provided for. In this manner, a larger rotational movement of the thigh support 40 translates to a slightly smaller rotational movement of the tilt plate 16 about the first horizontal axis 20 where such change in rotational movement is provided for by the dynamic spring 70 extending between the thigh support 40 and the tilt plate 16. The rotational movement of the tilt plate 16 is translated to a rotational movement of the cushion spring 22 that results in an even lesser rotational movement of the cushion spring 22 about the second horizontal axis 26. These various rotational movements cooperate to define the dynamic movement of the vehicle seat 14 to provide varying degrees of comfort to most any occupant body type seated within the vehicle seat 14.

According to the various embodiments, the dynamic springs 70 can be sized to accommodate specific users of certain vehicles. By way of example, and not limitation, typically, a smaller occupant may purchase a vehicle fitted with a smaller dynamic spring 70 as a component of the multi-component spring assembly 10. Conversely, larger occupants may purchase a vehicle having a larger dynamic spring 70 incorporated in the vehicle seat 14 to account for the larger-sized occupant. It is further contemplated that individual seating assemblies can be custom made for a particular vehicle to accommodate an occupant of a particular size. In such an embodiment, the dynamic spring 70 and the cushion spring 22 can be sized to provide the proper amount of resistance to accommodate a particular user or range of users.

In the various embodiments, the cushion spring 22, similar to the dynamic spring 70, can be tuned to accommodate a particular occupant or range of occupants. The cushion spring 22 can include a series of spring wires that form a planar region on which the base cushion 64 rests. These spring wires can be sized and/or can include various materials that increase or decrease the biasing force applied to the bias the tilt plate 16 toward the upward position 28, depending on the amount of biasing force needed for the particular vehicle seat 14.

Referring again to FIGS. 1-9, it is contemplated that the vehicle seat 14 can include the tilt plate 16 that is rotationally coupled at the first horizontal axis 20 to the front 18 of the base 12. The cushion spring 22 extends from a rear 24 of the base 12 to the tilt plate 16. Rotation of the tilt plate 16 about the first horizontal axis 20 serves to rotate the cushion spring 22 about the second horizontal axis 26. The thigh support 40 is rotationally coupled to the tilt plate 16, where the dynamic spring 70 biases the thigh support 40 away from the tilt plate 16. According to the various embodiments, it is contemplated that the rotational operation of the thigh support 40 can be around the first horizontal axis 20. It is also contemplated that the rotation of the thigh support 40 can be around a separate third horizontal axis 120 that is different than the first and second horizontal axes 20, 26. According to various embodiments that include right and left thigh supports 100, 102, each of the right and left thigh supports 100, 102 can include a dedicated third horizontal axis 120 that is out of parallel with the first and second horizontal axis 20, 26. In such an embodiment, as the right and left thigh supports 100, 102 are moved in the rotationally downward direction 46, the right and left thigh supports 100, 102 may also define a flared outward movement 130 to provide a wider support surface to support the legs of the occupant. In such an embodiment, the right and left thigh supports 100, 102 are angled outward and away from a central axis 132 of a vehicle seat 14 to provide this widened support surface for the legs and hamstring areas of an occupant. It is further contemplated that movements of the tilt plate 16 about the first horizontal axis 20 can serve to at least partially rotate the third horizontal axis 120 for a single thigh support 40 or each dedicated third horizontal axis 120 for the right and left thigh supports 100, 102 around the first horizontal axis 20. This rotation of the third horizontal axis 120 or the dedicated third horizontal axis 120 can further define the dynamic support provided by the multi-component spring assembly 10 as the downward force 60 provided by the occupant's legs and hamstring area move the thigh support 40 in a downward direction to engage the dynamic motion of the multi-component spring assembly 10.

Referring again to FIGS. 2-5, the suspension anchor 42 can be an integral part of the tilt plate 16 that is formed as part of the tilt plate 16. Alternatively, the suspension anchor 42 can be a separate piece that is attached to the tilt plate 16 for rotation therewith about the first horizontal axis 20. As described above, the suspension anchor 42 includes the cushion spring anchor 44 integrated therein for attaching the cushion spring 22 thereto. In this manner, as the suspension anchor 42 rotates about the first horizontal axis 20, the engagement of the cushion spring 22 within the cushion spring anchor 44 stretches the cushion spring 22 and also operates the cushion spring 22 about the second horizontal axis 26 at the rear 24 of the base 12 of the vehicle seat 14.

Referring again to FIGS. 2-4, a portion of the thigh support 40 can engage the tilt plate 16 within a recess defined within the suspension anchor 42. In such an embodiment, the suspension anchor 42 can include a hinge mechanism that defines the third horizontal axis 120 to which the thigh support 40 engages and operates about.

Referring again to FIGS. 5 and 6, the dynamic spring 70 can include a base portion 140 that attaches to a portion of the tilt plate 16. Upward from the base portion 140, the dynamic spring 70 includes at least one angled section. A first angled section 142 at least partially defines the high-resistance portion 72 of the dynamic spring 70. Above the first angled section 142, the second angled section 144 defines the low-resistance portion 74 of the dynamic spring 70. As discussed above, the high-resistance portion 72 can include a thicker cross section of material than the low-resistance portion 74 of the dynamic spring 70, such that the first and second upward biasing forces 80, 84 can be dynamically applied to the thigh support 40 as greater downward forces 60 are applied to the thigh support 40. The low-resistance portion 74 of the dynamic spring 70 includes at least one attachment portion 146 that extends into a spring receiver 148 of the thigh support 40 for securing the dynamic spring 70 to the thigh support 40. It is contemplated that the dynamic spring 70 can be defined by a single continuous metallic member that is shaped to define the unloaded position of the dynamic spring 70. During manufacture of the dynamic spring 70, the thicker cross-sectional portion of the high-resistance portion 72 can be made at the same time as the thinner cross-sectional area of low-resistance portion 74 of the dynamic spring 70. The high and low-resistance portions 72, 74 can also be defined by different materials having a single cross-sectional thickness. The materials can include different characteristics that translate to the first and second upward biasing forces 80, 84.

According to the various embodiments, the multi-component spring assembly 10 can be incorporated into any one of various seats that can include, but are not limited to, a driver's seat, a passenger's seat, a second row seat, third row seating, combinations thereof, and other similar seating positions.

According to the various embodiments, the multi-component spring assembly 10 operates to allow for greater deflection of the thigh supports 40 and seat cushion at the initial thigh loading by the occupant as they place their weight in the seat. The dynamic nature of the multi-component spring assembly 10 provides greater oppositional biasing force as more weight is applied to the seat as the occupant fully rests in the seat. Accordingly, all body types will receive at least some dynamic deflection as they sit within the vehicle seat 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
   a tilt plate coupled to a front of a base and operable about a first horizontal axis between a plurality of tilting positions;
   a cushion spring extending from a rear of the base to the tilt plate proximate the first horizontal axis, wherein operation of the tilt plate about the first horizontal axis further operates the cushion spring about a second horizontal axis positioned proximate the rear of the base, wherein the tilt plate includes a suspension anchor that extends upward from the tilt plate to a cushion spring anchor, wherein the cushion spring extends from the rear of the base to the cushion spring anchor, and
   a thigh support that is rotationally coupled to the tilt plate proximate the suspension anchor, wherein the thigh support is biased away from the tilt plate toward an unloaded state.

2. The vehicle seat of claim 1, wherein the cushion spring biases the tilt plate toward an upward position of the plurality of tilting positions.

3. The vehicle seat of claim 1, wherein operation of the tilt plate and the cushion spring anchor in a rotationally downward direction about the first horizontal axis biases the cushion spring away from the rear of the base and operates the cushion spring to a lowered position.

4. The vehicle seat of claim 1, wherein a downward force applied to the thigh support biases the thigh support toward the tilt plate and, in turn, biases the tilt plate in a rotationally downward direction.

5. The vehicle seat of claim 1, wherein a dynamic spring is positioned between the thigh support and the tilt plate, wherein the dynamic spring includes a high-resistance portion and a low-resistance portion.

6. The vehicle seat of claim 5, wherein the high-resistance portion is coupled to the tilt plate and wherein the low-resistance portion is coupled to the thigh support.

7. The vehicle seat of claim 6, wherein the low-resistance portion exerts a first upward biasing force to the thigh support, and wherein the high-resistance portion exerts a second upward biasing force to the thigh support, wherein the second upward biasing force is greater than the first upward biasing force.

8. The vehicle seat of claim 6, wherein a downward movement of the thigh support from the unloaded state includes a first downward portion that is primarily opposed by the first upward biasing force, and a second downward portion that is opposed by both of the first and second upward biasing forces.

9. The vehicle seat of claim 1, further comprising:
   right and left thigh supports adapted for independent and selective movement with respect to the tilt plate, wherein a first dynamic spring biases the right thigh support away from the tilt plate and wherein a second dynamic spring biases the left thigh support away from the tilt plate, and wherein the cushion spring includes a right portion coupled to the tilt plate proximate the right thigh support and a left portion coupled to the tilt plate proximate the left thigh support.

10. A vehicle seat comprising:
    a tilt plate rotationally coupled at a first horizontal axis to a front of a base;
    a cushion spring extending from a rear of the base to the tilt plate, wherein rotation of the tilt plate rotates the cushion spring about a second horizontal axis; and
    a thigh support rotationally coupled to the tilt plate, wherein a dynamic spring biases the thigh support away from the tilt plate.

11. The vehicle seat of claim 10, wherein the cushion spring biases the tilt plate toward an upward position.

12. The vehicle seat of claim 10, wherein the second horizontal axis is proximate the rear of the base.

13. The vehicle seat of claim 10, wherein a dynamic spring is positioned between the thigh support and the tilt plate, wherein the dynamic spring includes a high-resistance portion coupled to the tilt plate and a low-resistance portion coupled to the thigh support.

14. The vehicle seat of claim 13, wherein the low-resistance portion exerts a first upward biasing force to the thigh support, and wherein the high-resistance portion exerts a second upward biasing force to the thigh support, wherein the second upward biasing force is greater than the first upward biasing force.

15. A vehicle seat comprising:
   a cushion spring biasing a tilt plate toward an upward position relative to a base; and
   a dynamic spring biasing a thigh support away from the tilt plate, wherein a downward force applied to the thigh support biases the thigh support toward the tilt plate, biases the tilt plate in a rotationally downward direction, and biases the cushion spring to a lower position relative to the base.

16. The vehicle seat of claim 15, wherein the tilt plate operates about a first horizontal axis positioned proximate a front of the base and the cushion spring engages the tilt plate at a cushion spring anchor, and wherein the cushion spring extends from a rear of the base to the cushion spring anchor, wherein movement of the cushion spring to the lower position is about a second horizontal axis positioned proximate a rear of the base.

17. The vehicle seat of claim 15, wherein the dynamic spring includes a high-resistance portion coupled to the tilt plate and a low-resistance portion coupled to the thigh support, and wherein the low-resistance portion exerts a first upward biasing force to the thigh support, and wherein the high-resistance portion exerts a second upward biasing force to the thigh support, wherein the second upward biasing force is greater than the first upward biasing force.

18. The vehicle seat of claim 17, wherein a downward movement of the thigh support from an unloaded state includes a first downward portion that is primarily opposed by the first upward biasing force, and a second downward portion that is opposed by both of the first and second upward biasing forces.

* * * * *